United States Patent Office 3,634,238
Patented Jan. 11, 1972

3,634,238
ORGANIC COMPOSITIONS CONTAINING AMINES AND METALS OR SALTS THEREOF
Robert F. Bridger, Hopewell, N.J., assignor to Mobil Oil Corporation
No Drawing. Filed Mar. 12, 1969, Ser. No. 806,723
Int. Cl. C10m 1/00, 1/54
U.S. Cl. 252—26
21 Claims

ABSTRACT OF THE DISCLOSURE

Organic compositions are provided which are stabilized against oxidation by adding thereto a combination of an amine and a metal from Series 3 of the Periodic Table having an atomic number of at least 27, or an acid salt of such metal. The amines are the secondary and tertiary aromatic amines, the bis(diaromatic amines) and the arylene diamines.

BACKGROUND OF THE INVENTION

Field of the invention

This invention relates to the stabilization of organic compositions against oxidative deterioration by the addition thereto of a combination of an amine and a metal or acid salt of such metal.

Description of the prior art

It is well-known that many organic liquids and solids used in industrial applications, such as oils and greases, power transmission fluids, resin and polymer coatings, insulation materials, and structural products and the like, may deteriorate and lose their ability to function when subjected to oxidation. Since these substances are very often used at high temperatures, the rate of oxidation breakdown can be very rapid. This problem is particularly important in the operation of current automotive and aircraft engines. The breakdown of a lubricating oil (synthetic or natural), for example, is frequently accompanied by the formation of corrosive acids, sludge and other products of such breakdown. These resulting products can harm the metal surfaces and lead to complete uselessness of the lubricant.

The art is continually seeking agents which act as antioxidants, and it is well-known that certain amines alone, such as N-phenyl-α or β-naphthylamine, are useful for this purpose.

Also, amines have been combined with metal compounds to provide additives useful as antioxidants. Thus, U.S. Pat. No. 3,231,499 teaches the use of an alkane dionate cobalt coordination compound, as for example cobalt 2,4-pentanedionate (also called cobalt acetylacetonate).

SUMMARY OF THE INVENTION

In accordance with this invention, there are provided organic compositions comprising a major amount of an organic compound normally susceptible to oxidative deterioration and a minor stabilizing amount of an additive combination in admixture therewith, said additive combination consisting essentially of a secondary or tertiary aromatic amine, a bis(diaromatic amine) or an arylene diamine and a metal from Series 3 of the Periodic Table having an atomic number of at least 27, or an acid salt thereof.

Broad description of the amine

The secondary and tertiary amines are characterized in that each aromatic portion may be a single aromatic ring or a multiple ring system, including fused rings, containing up to 20 carbon atoms each. Thus, the term "aromatic" will include radicals derived from benzene, naphthene, anthracene, and the like. Also, for the purpose of this disclosure, the term shall include radicals from the quinones, such as benzo-, naphtho- and anthroquinone. Still further, "aromatic amine" may be one in which the amino nitrogen is a part of a fused ring system containing from 3 fused rings (including the one in which the nitrogen appears) to a total of 5 fused rings. The aromatic portion may be substituted with alkyl ($C_1$–$C_{18}$), alkoxy ($C_1$–$C_{12}$), halo (i.e., Br, Cl, F, I), nitro, alkylthio, alkylamino, arylamino, and carboxyl.

The bis(diaromatic amines) contemplated by the invention are those containing aromatic groups totaling from 24 carbon atoms to about 40 carbon atoms. In addition, the aromatic portions may be substituted as above. These amines are prepared by the dimerization of a secondary organic amine as will be described.

The arylene diamines useful in the invention are the N-alkyl or -aryl-N'-alkyl or -aryl arylene diamines. The alkyl or aryl portions may have from 1 to about 24 carbon atoms, and "aryl" may be a single or a multiple ring system including fused rings. The arylene portion may be a single ring (as phenylene) or a fused ring containing up to 18 carbon atoms, including those derived from naphthalene, anthracene, and, for the purposes of this disclosure, the quinones such as benzoquinone, naphthoquinone and anthroquinone. "Arylene" may also be a benzo-, naphtho-, or anthroquinone radical in which one of the double bonded oxygens is replaced by one of the N's, as for example in 2-anilino-1,4-naphthoquinone-4-anil. The herein defined aryl and arylene groups may be substituted in the same manner as defined for the other amines.

More particularly, the amines contemplated are selected from the following formulas:

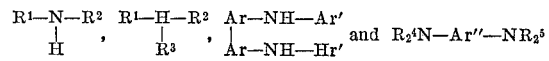

wherein:
$R^1$, $R^2$ and $R^3$ are phenyl, naphthyl, anthracyl, benzoquinolyl, naphthoquinolyl, anthroquinolyl,

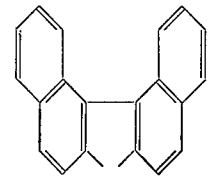

when two of $R^1$, $R^2$ and $R^3$ are taken together and the substituted members thereof, when the substituents are $C_1$–$C_{18}$ alkyl, $C_1$–$C_{12}$ alkoxy, halo, nitro, alkylthio, alkylamino, arylamino, and carboxyl;

Ar and Ar' are phenyl, naphthyl and substituted naphthyl and phenyl, wherein the substituents are the same as defined for $R^1$, $R^2$ and $R^3$;

Ar" is phenylene, naphthylene, anthracylene, benzoquinolylene, naphthoquinolylene, anthroquinolylene,

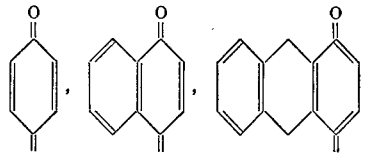

and the substituted members thereof, wherein the substituents are the same as defined for $R^1$, $R^2$ and $R^3$;

$R^4$ and $R^5$ are hydrogen, phenyl, naphthyl, anthracyl, alkyl of from 1 to about 18 carbon atoms, and the substituted phenyl, naphthyl and anthracyl, wherein the substituents are the same as defined for $R^1$, $R^2$ and $R^3$.

Almost all the amines contemplated by this invention are old and readily available from commercial sources. However, in the description appearing hereinafter, the following amines will be shown in admixture with metals or acid salts thereof.

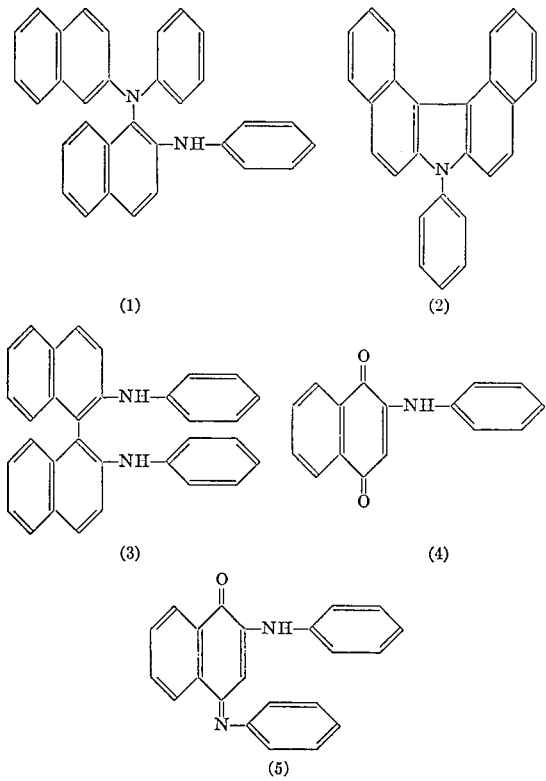

These products may be made by selective oxidation of N-phenyl-2-naphthylene. Compounds (1), (2) and (3) are prepared under low oxidation conditions; compounds (4) and (5) are made using high oxidation rates. For example, compound (3) may be made by heating N-phenyl-2-naphthylamine at 245° C. for 2 hours while passing a stream of air below the surface of the reactant. Compound (3) may also be prepared from N-phenyl-2-naphthylamine and potassium permanganate. One such preparation was accomplished as follows:

250 grams of the amine in acetone was added to 63 grams of potassium permanganate over 4½ hours at 0–3° C. The mixture was stirred for 40 hours at 25° C. and then was filtered and the filtrate stripped to 90° C. at 0.2 mm. Hg. This material was crystallized from ether, and recrystallized to give the product melting at 162.5–164° C.

The other products may be similarly made, using the appropriate oxidative conditions.

The metals and acid salts

The metals which may be used in the practice of this invention are, as already mentioned, those appearing in Series 3 of the Periodic Table and which have an atomic number of at least 27. Examples of such metals are cobalt, nickel, copper and zinc. Cobalt is the preferred metal.

In addition to the metals per se, they may be used in the form of their acid salts. By acid is meant a mono- or polycarboxylic acid, the latter preferably containing no more than about 2 carboxyls, which contains a saturated or unsaturated hydrocarbyl chain of from 2 to about 24 carbon atoms in its structure. The carboxylic acid may also contain a cyclic structure, either cycloaliphatic or aromatic containing a total of from about 5 carbon atoms to about 15 carbon atoms in the cyclic structure.

Preferably the aliphatic carboxylic acids will contain from 4 carbon atoms to 18 carbon atoms, and the most preferred one is stearic acid. Among the cycloaliphatic and aromatic acids, those having from about 6 carbon atoms to about 12 carbon atoms are preferred, and the most preferred is one containing about 10 carbon atoms, as for example, naphthenic acid.

The amine may be effectively used over the range of from about 0.05% to about 10% by weight of the stabilized organic compound. The preferred range is from about 0.1% to about 5% by weight, and most preferably from about 0.1% to about 1.0%.

When the metal is used in combination with the amine and organic compound, the effective range will be from about 1 cm.$^2$ surface area per kg. of organic compound to about 1000 cm.$^2$ per kg.; preferably from about 10 cm.$^2$ to 200 cm.$^2$ per kg. The acid salt may be used at a concentration of from about 0.0005 to about 2% by weight of the organic compound, preferably from about 0.001% to about 1% by weight.

It has been discovered in accordance with this invention that the additive combinations of the invention are synergistic in their effect and provide excellent, and even startling, stabilizing properties to various organic substances whether or not of lubricating viscosity, but particularly to lubricating oils and greases wherein the base medium is a hydrocarbon or synthetic lubricant. The preferred base fluids according to this invention include hydrocarbon mineral oils, both paraffinic and naphthenic, olefin fluids, polyolefin fluids, polyether fluids, polyacetals, alkylene oxide polymers, silicone-base fluids, including those prepared from polysiloxanes and olefins and the dehydrocondensed products thereof, and ester fluids. The esters of dicarboxylic acids and monohydric alcohols and the trimethylol propane and pentaerythritol esters of monocarboxylic acids are of special interest in the practice of this invention. Suitable diesters include esters of oxalic, malonic, succinic, glutaric, adipic, pimelic, suberic, azelaic and sebacic acids, cyclohexane dicarboxylic acid, phthalic acid, terephthalic acid, and the like, and alcohols having from 1 to about 20 carbon atoms. A commonly used diester is di(2-ethylhexyl) sebacate.

The acids used informing the trimethylol propane and pentaerythritol esters include those containing from 1 to about 30 carbon atoms (prepared from single and mixed monocarboxylic acids), having straight and branched-chain aliphatic, cycloaliphatic, aromatic and alkylated aromatic structures. Typical carboxylic acids useful in preparing such esters include acetic, propionic, butyric, valeric, iso-valeric, caproic, caprylic, pelargonic, capric, iso-deconic, lauric, and benzoic, nonylbenzoic, dodecylbenzoic, naphthoic, cyclohexane carboxylic acids and the like. Especially useful are the commercial grade valeric, which includes both n-valeric and iso-valeric, and pelargonic acids. The most preferred ester for the practice of this invention is one prepared from pentaerythritol and a mixture of commercial valeric acid and pelargonic acid.

In addition to the fluids mentioned above, the additive combination provides antioxidant properties to polymeric materials susceptible to oxidation, such as polyurethanes, synthetic rubbers such as GR-S rubbers, and polyolefins such as polyethylene, polypropylene, polybutylene and the like.

DESCRIPTION OF SPECIFIC EMBODIMENTS

The examples which follow are offered for the purpose of illustrating the various aspects of the invention without, however, any intent to limit the scope thereof.

EXAMPLE 1

Effect of copper metal with various amines

Following is the procedure for testing the antioxidant properties of the additive combination of this example. It is the same for all subsequent illustrations unless variations are shown for that particular example.

This test is conducted in an oxygen circulation apparatus of the type described by Dornte (Ind. Eng. Chem., 28, 26–30, 1936) modified so the rate of oxygen absorption can be recorded automatically. In general, a tube containing 30 gms. of an organic sample and the additive combination is placed in a thermostated heater. After thermal equilibrium is established, the sample tube is connected with the closed oxygen circulation system. Oxygen is circulated through a fritted glass disk near the bottom of the sample tube at the rate of 5 liters per hour. The time required for the adsorption of 1 mole of oxygen per kg. of sample is taken as the inhibition period. The longer the inhibition period, the greater is the oxidation resistance of the sample.

The following table shows the results obtained with copper metal and certain amines using a base stock prepared by reacting 1 mole of pentaerythritol with 3 moles of commercial valeric acid and 1 mole of pelargonic acid. The same fluid was used in the other examples unless stated otherwise.

TABLE I

| Amine used | Amine, weight percent | Temperature, ° C. | Inhibition period, hours | |
|---|---|---|---|---|
| | | | Without copper | With copper, 100 cm.²/kg. |
| | None | 175 | 2.0 | 2.0 |
| | do | 185 | 1.3 | |
| 1,1'-bis-PBN[1] | 0.218 | 175 | 6.0 | 25.3 |
| | .436 | 175 | 15.7 | 71.0 |
| | .872 | 175 | 43.8 | 64.1 |
| | | 185 | | |
| 1,1'-bis-DBNA[2] | None | 175 | 2.0 | 2.0 |
| | .268 | 175 | 27.2 | 49.8 |

[1] Has the structure

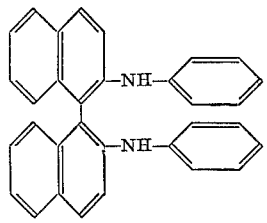

[2] Has the structure

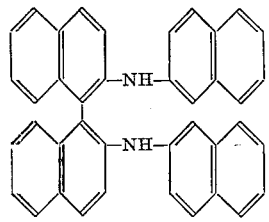

From the results shown in Table 1, the unexpected effect of copper metal is clearly evident. Its effect is all the more surprising in view of the well known fact that copper and its salts are catalysts for the oxidative degradation of oils. Thus, at 175° C., the ester fluid alone has an inhibition period of 2 hours, and the same period with copper. With 1,1'-bis-PBN as the only additive, the inhibition period is increased to 6 hours. Yet when copper is combined with the amine as a coadditive, the inhibition period is increased more than 4-fold to 25.3 hours. Similar results are obtained when using 1,1'-bis-DBNA alone and with copper.

EXAMPLE 2

Effect of copper salts with amines

TABLE 2

| Amine used | Amine weight percent | Copper salt | Weight percent (as Cu) | Temperature, ° C. | Inhibition period, hours |
|---|---|---|---|---|---|
| None | None | None | None | 175 | 2.0 |
| Do | do | Naphthenate | 0.033 | 175 | 1.4 |
| 1,1'-bis-PBN | 0.218 | None | None | 175 | 6.0 |
| | 0.218 | Naphthenate | 0.033 | 175 | 29.3 |
| | 0.218 | Stearate | 0.033 | 175 | 26.1 |

The effect of copper stearate alone in the oil gives a negligible inhibition period.

EXAMPLE 3

Nickel 2-ethylhexanoate (0.0138 weight percent) and 0.218 weight percent of 1,1'-bis-PBN in the ester fluid gave an inhibition period of 10.1 hours. The nickel salt alone in the oil gives a negligible inhibition period.

EXAMPLE 4

Zinc stearate (0.0253 weight percent) and 0.218 weight percent of 1,1'-bis-PBN in the ester fluid gave an inhibition period of 19.2 hours. The zinc salt alone in the oil gives a negligible inhibition period.

EXAMPLE 5

This example and the tables hereunder show the effects of cobalt carboxylates and amines on the ester fluid.

TABLE 3

| Amine used | Weight percent amine | Cobalt II salt | Weight percent salt | Temperature, ° C. | Inhibition period, hours |
|---|---|---|---|---|---|
| 1,1'-bis-PBN | 0.218 | Stearate | 0.025 | 175 | [1] >113.5 |

[1] Only 0.17 mole oxygen absorbed at 113.5 hours.

NOTE.—Cobalt stearate alone in oil gives a negligible result.

TABLE 3A

| Amine used | Weight percent amine | Cobalt stearate, weight percent | Temperature, ° C. | Inhibition period, hours |
|---|---|---|---|---|
| None | None | None | 232 | 2.3 |
| Do | do | 0.1 | 232 | 2.4 |
| 1,1'-bis-PBN | 1.0 | None | 232 | 2.4 |
| | 1.0 | 0.1 | 232 | 32.4 |
| | 2.0 | 2.0 | 232 | 34.1 |
| | 2.0 | 0.1 | 232 | 34.2 |

TABLE 3B

| Amine used | Weight percent amine | Cobalt II stearate weight percent | Temperature, ° C. | Inhibition period, hours |
|---|---|---|---|---|
| PAN[a] | 1.0 | None | 232 | 3.6 |
| | 1.0 | 0.01 | 232 | 26.1 |
| PBN[b] | 1.0 | None | 232 | 3.0 |
| | 1.0 | 0.01 | 232 | 20.9 |
| | 1.0 | 0.1 | 232 | 30.6 |
| DBNA[c] | 1.23 | None | 232 | 7.9 |
| | 1.23 | 0.01 | 232 | 22.3 |
| 1,1'-bis-PBN | 1.00 | None | 232 | 2.4 |
| | 1.00 | 0.01 | 232 | 29.6 |
| | 1.00 | [d]0.1 | 232 | 20.8 |
| TPA[e] | 1.13 | None | 232 | 3.0 |
| | 1.13 | 0.01 | 232 | 12.9 |
| None | None | None | 232 | 2.3 |
| | do | 0.01 | 232 | 2.4 |

[a] N-phenyl-α-naphthylamine.
[b] N-phenyl-β-naphthylamine.
[c] Di-β-naphthylamine.
[d] Cobalt naphthenate.
[e] Triphenylamine.

The following Table (3C) sets forth results obtained at 232° C. with cobalt II stearate and various amines in further oxidation tests. The amines used were:
(1) Diphenylamine
(2) N-p-anisyl-2-Naphthylamine

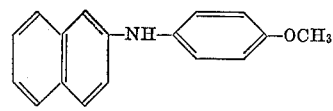

(3) N-(2-naphthyl)-N,N'-diphenyl - 1,2 - naphthylenediamine

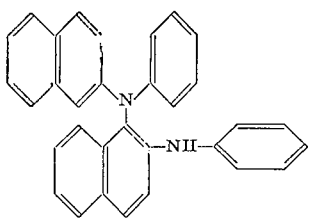

(4) 7-phenyl-dibenzo[c,g] carbazole

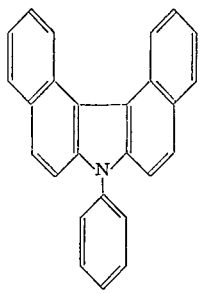

(5) 2,5-bis-t-butylamino-p-benzoquinone

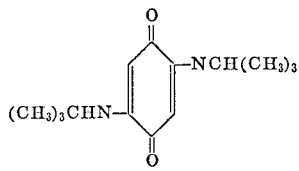

(6) 2-anilino-1,4-naphthoquinone

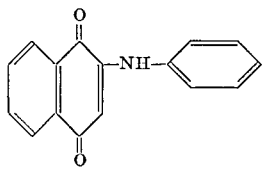

(7) 2-anilino-1,4-naphthoquinone-4-anil

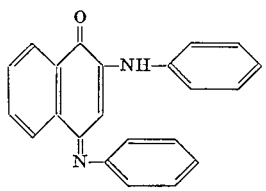

TABLE 3C

| Amine used | Weight percent amine | Cobalt stearate, weight percent | Inhibition period, hours |
|---|---|---|---|
| 1 | 0.58 | None | 2.5 |
|  | 0.58 | 0.01 | 18.8 |
| 2 | 1.14 | None | 5.9 |
|  | 1.14 | 0.01 | 27.7 |
| 3 | 2.00 | None | 2.8 |
|  | 2.00 | 0.01 | 26.0 |
| 4 | 1.57 | None | 1.9 |
|  | 1.57 | 0.01 | 9.4 |
| 5 | 1.20 | None | 3.8 |
|  | 1.20 | 0.01 | 6.1 |
| 6 | 1.14 | None | 12.0 |
|  | 1.14 | 0.1 | 16.1 |
| 7 | 1.43 | None | 7.0 |
|  | 1.43 | 0.01 | 13.4 |
| None | None | 0.01 | 2.4 |

EXAMPLE 6

The following results illustrate the effectiveness of the additive combination in a mineral oil. The same test procedure as before was used, except that the ester fluid was replaced by a white naphthenic mineral oil having a kinematic viscosity of 8 cs. at 210° F. The temperature of the tests was 150° C.

| Amine used | Weight percent amine | Cobalt stearate, weight percent | Inhibition period, hours |
|---|---|---|---|
| 1,1'-bis-PBN | 0.436 | None | 3.1 |
|  | 0.436 | 0.025 | 16.8 |
| PBN | 0.436 | None | 29.3 |
|  | 0.436 | 0.025 | 251 |
| None | None | None | 0.8 |
|  | ..do..... | 0.025 | 0.5 |

While the present invention has been described in considerable detail in connection with a few specific embodiments for specific purposes, it is apparent that novel compositions of this invention are not restricted to such embodiments nad details for there are many obvious modifications and variations which enhance their wide application in various types of utilization. Accordingly, the present invention should not be construed as limited in any particulars except as may be recited in the appended claims or required by the prior art.

I claim:
1. An organic composition comprising a major amount of a lubricating oil or grease and a stabilizing amount of an additive combination in admixture therewith, said additive combination consisting essentially of (1) an amine having on of the formulas

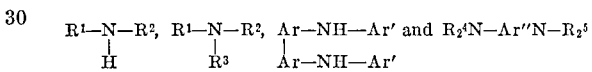

wherein:
$R^1$, $R^2$ and $R^3$ are selected from the group consisting of phenyl, benzoquinolyl, naphthoquinolyl, anthroquinolyl, or

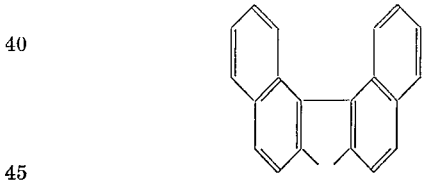

when two of $R^1$, $R^2$ and $R^3$ are taken together, and the substituted members thereof, wherein the substituent is from the group consisting of $C_1$–$C_{18}$ alkyl, $C_1$–$C_{12}$ alkoxy, halo, nitro, and carboxyl;

Ar is selected from the group consisting of phenylene, naphthylene and the substituted members thereof, wherein the substituent is as defined for $R^1$,$R^2$ and $R^3$;

Ar' is selected from the group consisting of phenyl, naphthyl and the substituted members thereof, wherein the substituent is as defined for $R^1$, $R^2$ and $R^3$;

Ar" is selected from the group consisting of phenylene, naphthylene, anthracylene, benzoquinolylene, naphthoquinolylene, anthroquinolylene,

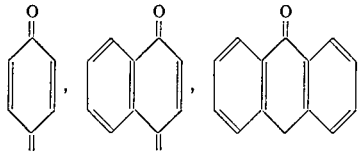

and the substituted members thereof, wherein the substituent is as defined for $R^1$, $R^2$ and $R^3$; and $R^4$ and $R^5$ are selected from the group consisting of hydrogen, phenyl, naphthyl, anthracyl, alkyl of from 1 to about 18 carbon atoms, and the substituted phenyl, naphthyl and anthracyl, wherein the substituent is as defined for $R^1$, $R^2$ and $R^3$ and (2) a metal selected from the group consisting of cobalt, nickel, copper and zinc, or a carboxylic acid salt of said metal.

2. The composition of claim 1 wherein the lubricating oil is a mineral lubricating oil.

3. The composition of claim 1 wherein the amine is a bis(diaromatic amine) containing aromatic groups totalling from 24 to 40 carbon atoms.

4. The composition of claim 1 wherein the amine is an N-alkyl or -aryl-N'-alkyl or -aryl arylene diamine wherein said alkyl and aryl have from 1 to about 24 carbon atoms, and said arylene contains from 6 to 18 carbon atoms.

5. The composition of claim 1 wherein said metal is selected from the group consisting of cobalt, copper, zinc and nickel.

6. The composition of claim 1 wherein said carboxylic acid contains one or more carboxyls and a saturated or unsaturated hydrocarbyl chain of from about 2 carbon atoms to about 24 carbon atoms.

7. The composition of claim 1 wherein the carboxylic acid is stearic acid.

8. The composition of claim 1 wherein the carboxylic acid is 2-ethylhexanoic acid.

9. The composition of claim 1 wherein the acid is naphthenic acid.

10. The composition of claim 1 wherein the amine is 1,1-bis(N-phenyl-2-naphthylamine).

11. The composition of claim 1 wherein the amine is 7-phenyl-dibenzocarbazole.

12. The composition of claim 1 wherein the amine is 2-anilino-1,4-naphthoquinone.

13. The composition of claim 1 wherein the amine is N-phenyl-β-naphthylamine.

14. The composition of claim 1 wherein the amine is di-β-naphthylamine.

15. The composition of claim 1 wherein the amine is 1,1'-bis(N-phenyl-2-naphthylamine), the carboxylic acid salt is cobalt stearate and the organic compound is a synthetic ester prepared from pentaerythritol and a mixture of valeric and pelargonic acids in a ratio of 3 moles of valeric acid to 1 mole of pelargonic acid.

16. An organic composition comprising a major amount of a lubricating oil or grease and a stabilizing amount of a combination of:

(1) an amine of one of the formulas

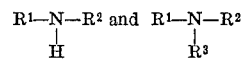

wherein $R^1$, $R^2$ and $R^3$ are selected from the group consisting of phenyl, naphthyl, anthracyl and the substituted members thereof, where the substituent is selected from the group consisting of $C_1$–$C_{18}$ alkyl, $C_1$–$C_{12}$ alkoxy, halo, nitro and carboxyl, and (2) cobalt stearate.

17. The composition of claim 1 wherein the lubricating oil is a synthetic lubricating oil.

18. The composition of claim 5 wherein said oil is an ester oil made from pentaerythritol and a mixture of valeric and pelargonic acids.

19. The composition of claim 1 wherein said carboxylic acid contains one or more carboxyls and is a cyclic acid containing from about 5 carbon atoms to about 15 carbon atoms in the cyclic structure.

20. The composition of claim 19 wherein said cyclic acid is a cycloaliphatic acid.

21. The composition of claim 19 wherein said cyclic acid is an aromatic acid.

References Cited

UNITED STATES PATENTS

| | | | |
|---|---|---|---|
| 2,718,501 | 9/1955 | Harle | 252—47 |
| 2,813,076 | 11/1957 | Edelman et al. | 252—400 |
| 3,129,185 | 4/1964 | Rizzuti et al. | 252—400 |
| 3,231,497 | 1/1966 | Koch et al. | 252—400 |
| 3,290,242 | 12/1966 | Ravner et al. | 252—26 |
| 3,505,225 | 4/1970 | Wheeler | 252—51.5 A |

FOREIGN PATENTS

| | | | |
|---|---|---|---|
| 1,018,301 | 1/1966 | Great Britain | 252—51.5 A |

DANIEL E. WYMAN, Primary Examiner

W. H. CANNON, Assistant Examiner

U.S. Cl. X.R.

252—37.2, 37.5

PO-1050
(5/69)

UNITED STATES PATENT OFFICE
CERTIFICATE OF CORRECTION

Patent No. 3,634,238          Dated January 11, 1972

Inventor(s) Robert F. Bridger

It is certified that error appears in the above-identified patent and that said Letters Patent are hereby corrected as shown below:

In column 2, line 36, "$R^1\text{-}H\text{-}R^2 \atop R^3$" should be -- $R^1\text{-}N\text{-}R^2 \atop R^3$ --.

In column 2, line 67, "whenin" should be -- wherein --. In column 6, line 68, "N-p-anisyl)" should be -- N-(p-anisyl) --. In column 8, line 18, "nad" should be -- and --. In column 8, line 29, "on" should be -- one --. In column 8, line 65, the third group should be -- 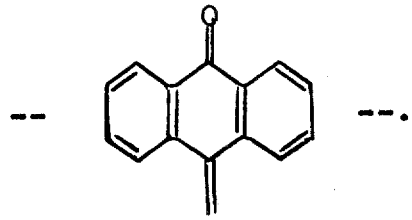 --.

In column 9, Claim 11, "7-phenyl-dibenzocarbazole" should be -- 7-phenyl-dibenzo[c,g]carbazole --. In column 10, Claim 18, the dependency should be on claim 17.

Signed and sealed this 27th day of June 1972.

SEAL)
ttest:

DWARD M. FLETCHER, JR.          ROBERT GOTTSCHALK
ttesting Officer                   Commissioner of Patents